(12) United States Patent
Moser

(10) Patent No.: US 11,604,816 B2
(45) Date of Patent: Mar. 14, 2023

(54) CONFIGURATION RUNTIME ON HOST PLATFORM

(71) Applicant: SAP SE, Walldorf (DE)

(72) Inventor: Martin Moser, Speyer (DE)

(73) Assignee: SAP SE, Walldorf (DE)

(*) Notice: Subject to any disclaimer, the term of this patent is extended or adjusted under 35 U.S.C. 154(b) by 63 days.

(21) Appl. No.: 16/851,639

(22) Filed: Apr. 17, 2020

(65) Prior Publication Data

US 2021/0326365 A1    Oct. 21, 2021

(51) Int. Cl.
*G06F 16/00* (2019.01)
*G06F 16/28* (2019.01)
*G06F 9/54* (2006.01)
*G06F 16/182* (2019.01)
*G06F 16/22* (2019.01)

(52) U.S. Cl.
CPC ............ *G06F 16/289* (2019.01); *G06F 9/541* (2013.01); *G06F 16/182* (2019.01); *G06F 16/2282* (2019.01)

(58) Field of Classification Search
CPC ...... G06F 16/289; G06F 9/541; G06F 16/182; G06F 16/2282; G06F 17/30607; G06F 17/30595; G06F 17/30286; G06Q 10/10; G06Q 10/06
See application file for complete search history.

(56) References Cited

U.S. PATENT DOCUMENTS

| | | | | |
|---|---|---|---|---|
| 6,598,037 | B1* | 7/2003 | Craig | G06F 16/289 |
| | | | | 707/999.001 |
| 2002/0063734 | A1* | 5/2002 | Khalfay | G06F 8/38 |
| | | | | 715/744 |
| 2018/0088926 | A1* | 3/2018 | Abrams | G06F 8/658 |
| 2018/0210712 | A1* | 7/2018 | Busjaeger | G06F 8/70 |
| 2019/0087176 | A1* | 3/2019 | Krishnappa | G06F 8/658 |
| 2019/0179631 | A1* | 6/2019 | Benedetti | G06F 9/44505 |
| 2021/0089357 | A1* | 3/2021 | Garaga | G06F 12/0848 |

* cited by examiner

*Primary Examiner* — Ashish Thomas
*Assistant Examiner* — Suman Rajaputra
(74) *Attorney, Agent, or Firm* — Buckley, Maschoff & Talwalkar LLC

(57) ABSTRACT

Provided is a system and method in which configuration content from central system is repackaged and distributed to applications on a host platform. In one example, the method may include receiving, via a host platform, configuration content from a central system, the configuration content comprising one or more configuration objects of a tenant, identifying an application of the tenant on the host platform which uses the one or more configuration objects based on a configuration object to application mapping, and distributing the one or more configuration objects to the identified application of the tenant on the host platform.

21 Claims, 8 Drawing Sheets

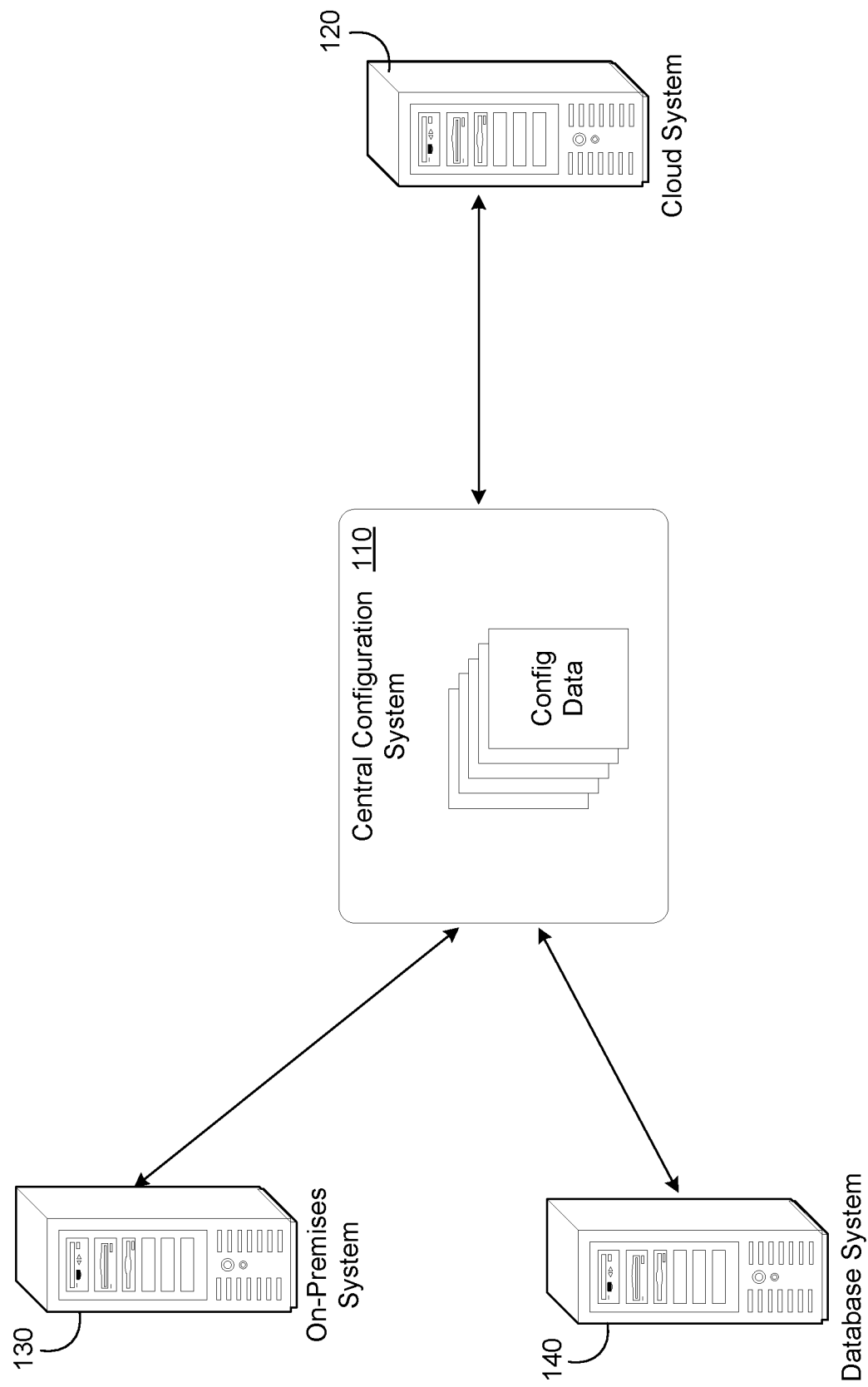

100C        FIG. 1C
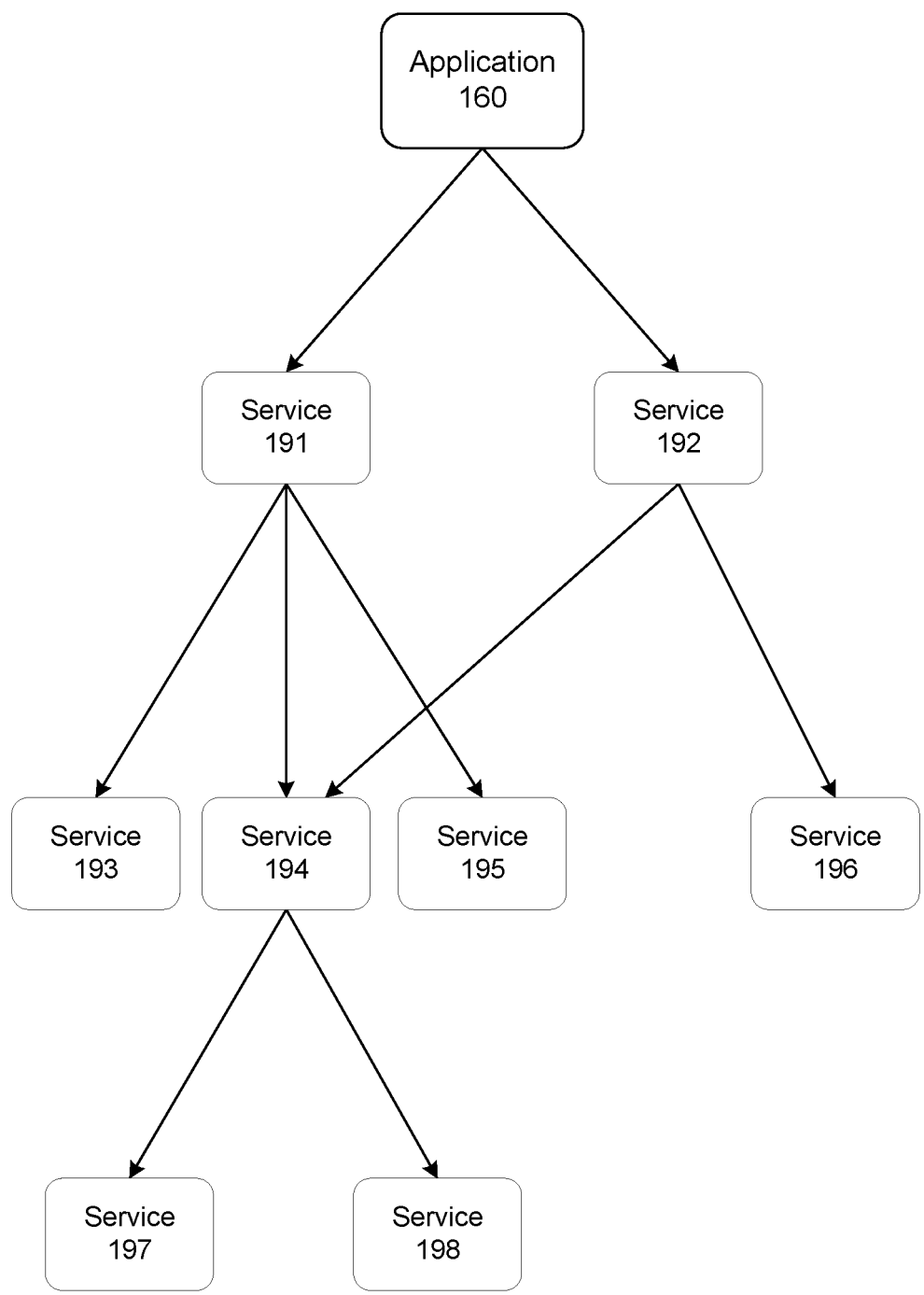

CONFIGURATION RUNTIME ON HOST PLATFORM

BACKGROUND

In a monolithic software application, all processes are tightly coupled and run as a single service. Meanwhile, in a microservices architecture, an application is broken up and each application process is run as its own microservice (or service). The microservices architecture is commonly employed by cloud computing environments. Each microservice may be built for a specific business capability or function. Because they are independent, each microservice can be updated, deployed, and scaled to meet demand for specific functions of an application.

In order for a group of services that make up an application to work properly they must be configured with consistent business configurations (e.g.; countries, languages, currency formats, etc.) In a traditional system, one central set of tables on the system stores the configuration data. Therefore, to change such configuration data, the developer simply accesses the system and implements the change through the central set of tables. However, for a microservices architecture, there is no single configuration but rather multiple individual configurations of the multiple services that must be configured consistently.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1A is a diagram illustrating a computing environment which includes a central configuration system in accordance with an example embodiment.

FIG. 1C is a diagram illustrating a microservices architecture of an application hosted on the host platform of FIG. 1B, in accordance with an example embodiment.

Figure 1B:
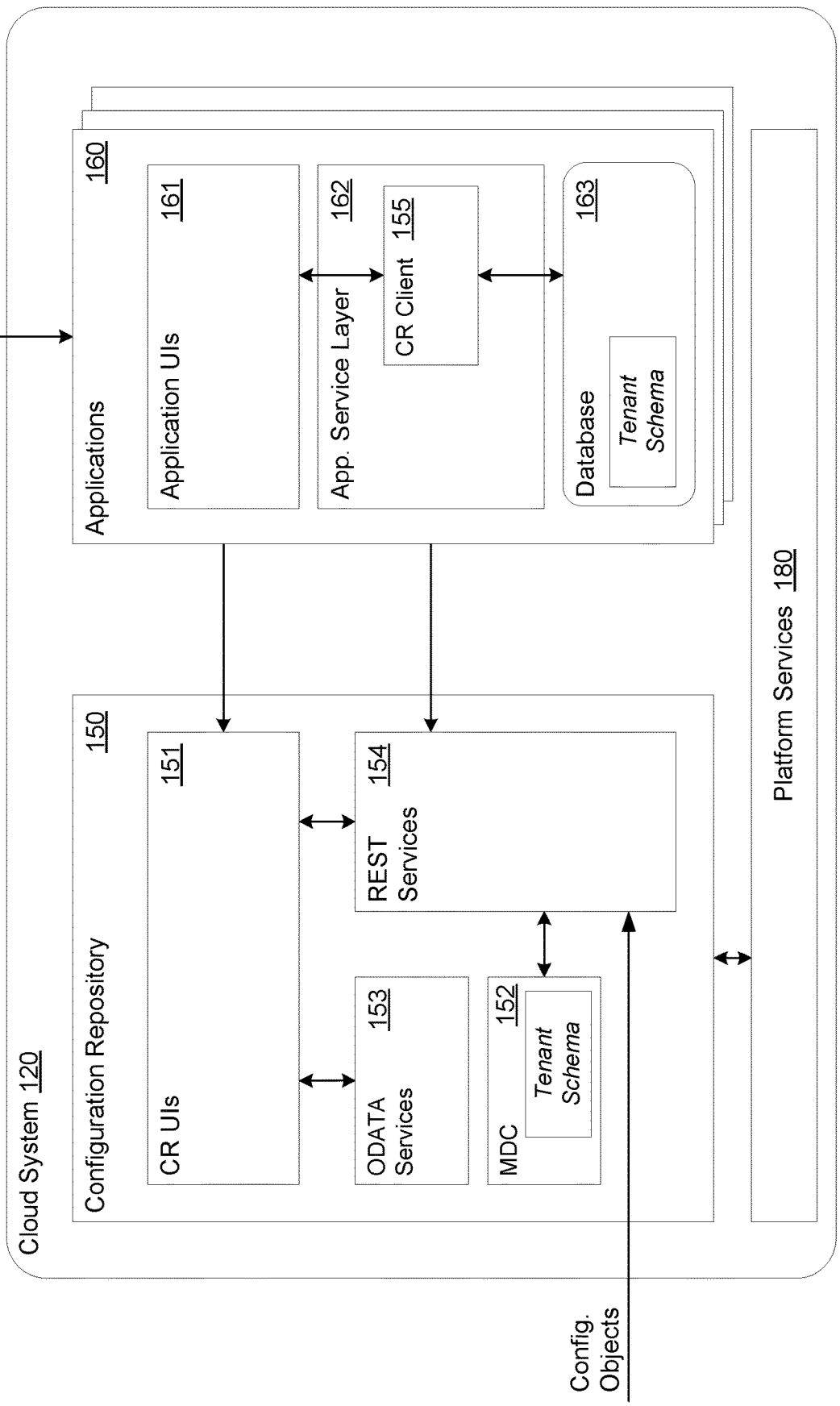
FIG. 1B is a diagram illustrating a computing environment for a host platform in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

A microservices architecture enables a software application to be built as a group of modular components. Each service supports a specific/unique task or business goal of the application and uses a simple well-defined interface such as an application programming interface (API) to communicate with the other services. For example, each service may have its own database and can generate alerts, log data, support user interfaces (UIs), perform authentication and identification, and the like.

Microservices make it easier to test and deploy changes to code. Because each service is separated from the others, fault isolation is also improved. If there is a problem in the software, the problematic service can be isolated, remediated, tested and redeployed without the need to regression test the entire application as with traditional monolithic application architectures. Further, microservices enhance business agility with faster software development and deployment compared to monolithic software architecture. However, microservices still require the same amount of services as a monolithic software product. Therefore, the management for a microservices architecture can be more complex given that each service is independent and not coupled to one another.

An instance of an application includes a local storage component (application storage). Likewise, an instance of a microservice includes a local storage component. The local storage components are used to hold business configuration content that is used by the functions of the application and its services. When an application receives an update to configuration content, the corresponding microservices must also be updated with consistent configuration content. However, individually updating each application and microservice can require a significant amount of time. Further complicating matters is when the host platform implements multiple different systems/environments (e.g., database, cloud, web services, etc.) Here, an application may interact with data and services across the different systems requiring individual configuration on each of the different systems.

The example embodiments are directed to a configuration repository which runs on a host platform (such as a cloud platform) and which can manage configuration of applications and corresponding microservices based on updated configuration content from a central system. Furthermore, the configuration repository may extract configuration content associated with an application during deployment of the application on the host platform and provide the identified configuration content to the central system. The configuration repository may also create and manage a mapping of configuration content to applications thereby preserving a link between each application/services and the corresponding configuration content. Meanwhile, the central system can manage the configuration content of all systems such as the database, the cloud, the web server environment, and the like.

In the examples herein, the configuration content may be implemented in the form of configuration objects. Different business data such as countries, languages, currencies, and the like, which are accessed by applications and/or services, may have their own configuration objects. The configuration of business data in the configuration objects are used to influence processes of the applications and services that work on other business objects that need to use countries, languages, currencies, etc. As a non-limiting example, an order process for a book can be configured to accept shipment addresses in a specific set of countries. The set of countries may be configured with a "country" configuration object that includes the values of content stored in the underlying tables. In this example, the billing process may behave differently when calculating the shipment price depending on the shipping address due to different shipment costs per country, etc.

For example, the country configuration object may provide ISO codes for different countries that are selected by the tenant in which the 2 letter or 3 letter values of the ISO codes represents the configuration content. This data may be accessed by the functions of the application and its corresponding microservices. Over time, the ISO codes within the configuration object titled "countries" may be changed by adding or deleting ISO codes. For example, the countries configuration object may initially include ISO codes for the United States (US), Germany (DE), and India (IN). At some point, the configuration object may be expanded to include the ISO code for Switzerland (CHE). The original version of the configuration object with three ISO codes and the modified version with four ISO codes may be referred to as different configuration content or different versions of the configuration of the countries configuration object.

The initial contents of configuration content (i.e., values for the tables), may be set by default. The configuration objects can be downloaded during build time of the application from a software repository. During the build, the configuration objects become part of the resulting application or service, which is then deployed in the cloud. During deployment time, the deployment mechanism creates the database tables based on the database models and fills the configuration objects with the initial content. Generally, only one version is provided, but also several versions of the configuration might be deployed. During runtime of the service/application more versions of the configuration might be added to the database tables. An application may consume several configuration objects, each having its own respective set of versions of configurations. In some embodiments, the configuration content may be time-dependent having different versions and start and stop times identifying when a particular version is active.

FIG. 1A illustrates a computing environment 100A which includes a central configuration system 110 in accordance with an example embodiment. Referring to FIG. 1A, the computing environment 100A includes a plurality of different systems including a cloud system 120, an on-premises system 130, and a database system 140. It should be appreciated that the computing environment 100A may include different and/or additional systems as shown in FIG. 1A. In this example, each system may have its own architecture for handling configuration objects/content. In some cases, a tenant may have an application that runs on one of the systems and which access data from the other systems.

Therefore, it is necessary for configuration content of the tenant to be the same across all systems.

The central configuration system 110 may provide a centralized location for the tenant to configure the individual configuration contents of applications across all systems 120, 130, and 140. For example, the central configuration system 110 may provide a user interface, etc., which a developer may access to make changes to configuration content. The central configuration system 110 may distribute the configuration content to the different systems 120, 130, and 140. For example, the central configuration system 110 may include a local client on each of the systems 120, 130, and 140, which can receive the configuration content and repackage the content according to the format/architecture of the respective system.

Likewise, if configuration of an application is changed on one of the respective systems, for example, the cloud system 120, the updated configuration content can be synchronized with the central configuration system 110 thereby allowing the updated configuration content to be propagated to the other systems 130 and 140.

FIG. 1B illustrates a computing environment 100B for a cloud system 120 in accordance with an example embodiment. In this example, a configuration repository 150 receives configuration content from the central configuration system 110, shown in FIG. 1A, and distributes the configuration content to an application 160 on the cloud system 120. Also, in this example, a user/client may access the application 160 via a web browser 170. Furthermore, although one application 160 is shown, it should be appreciated that the tenant may have multiple applications 160. Furthermore, the configuration repository 150 and the application 160 may access additional platform services 180 that are hosted on the cloud system 120.

Referring to FIG. 1B, the configuration repository 150 includes a user interface 151, database containers 152 holding tenant data, OData services 153 for accessing the tenant data stored in the database containers 152, and services 154 which expose access to the tenant data to applications 160 of the tenant that are running on the cloud system 120. A tenant is given its own instance of the application 160 which gives the tenant access rights to the application 160 and a tenant-specific data storage in a local database 163. All tenant applications should be configured with the same configuration content in the form of configuration objects thereby making the applications consistent across the tenant.

Here, the application 160 includes the local database 163 which stores configuration objects including configuration content (fields, values, field names, etc.) describing the format of tables where the configuration content is stored, OData services, user interface data, handler services, and the like, and is separated by tenant. For example, tenant separation may be implemented through a discriminator column, separate schemas, or the like. The application 160 may include a user interface 161 for accessing a service layer 162 of the application 160 which provides functionality for the application 160. In addition, the application 160 may include a client 155 of the configuration repository 150 which enables the configuration repository 150 to communicate with the application 160 and distribute content such as configuration objects.

In order for an application 160 and its underlying microservices (shown in the example of FIG. 1C) to work consistently, the configuration content across the application 160 and the microservices needs to be consistent. The configuration repository 150 makes sure that all microservices within a tenant are configured consistently. In this example, the application 160 (and underlying microservices) each have their own database for storing configuration objects therein. Each tenant has its own schema, and the configuration repository 150 may fill local configuration databases of the applications of a tenant with the same configuration data. Each application has its own database and they all need to have the same set of configuration data in their local database.

Referring to FIGS. 1A and 1B, the configuration repository 150 takes care of filling the application 160 with configuration data. Here, the configuration repository 150 may receive updates to already existing configuration objects that are running on the cloud system 120 from the central configuration system 110. The updates may be received via user inputs through a user interface provided by the central configuration system 110. The central configuration system 110 may provide the update content to all systems 120, 130, and 140, including the configuration repository 150 on the cloud system 120. That is, when a change takes place to a configuration content of a tenant, the central configuration system 110 replicates the change to all applications of the tenant that are running on the different systems 120, 130, and 140. In response to receiving the update from the central configuration system 110, the configuration repository 150 writes the updates to the correct applications (e.g., application 160, etc.) on the cloud system 120.

FIG. 1C illustrates a microservices architecture 100C in accordance with an example embodiment. For example, the microservices architecture 100C may be implemented within a cloud computing environment (e.g., Cloud Foundry, etc.) which is based on a microservices architecture. Referring to FIG. 1C, the application 160 is built with a plurality of modular components (i.e., services 191-198) which implement the functionality of the application 160. Here, the different services 191-198 perform different/unique functions and collaborate together to perform application tasks for the application 160. Also, the different services 191-198 may be provided independently of the application 160 and may perform tasks for other applications which are not shown. As described herein, the application 160 and the services 191-198 may be generally referred to as software artifacts.

In the example of FIG. 1C, the different services 191-198 are shown in a hierarchical graph. However, it should be appreciated that the services 191-198 may also interact with one another. For example, a service from among the different services 191-198 can call another one of the services from among the different services 191-198, creating a cascading effect. Therefore, instead of a hierarchical graph, as another example, the services 191-198 may be represented with an acyclic directed graph (ADG).

In the example of the microservices architecture 100C of FIG. 1C, the application 160 functionality is distributed across the different services 191-198. In other words, the application 160 consumes the services 191-198 to provide functionality for the application 160. The application 160 and each of the services 191-198 may have their own storage such as a database, a cache, etc. which can be used to hold configuration objects and configuration content therein.

As one example, the application 160 may be a sales order application that consumes a pricing service and a business partner service. Here, a customer may use the sales order application to conduct business in the US, Germany, and India. To work properly, the sales order application and the corresponding services must be configured with the same set of countries. As one example, the country data may be stored in a countries configuration object and content of the configuration may be stored in a table, etc. The countries object may then be recorded within the local storages of the application and the services.

Figure 2:
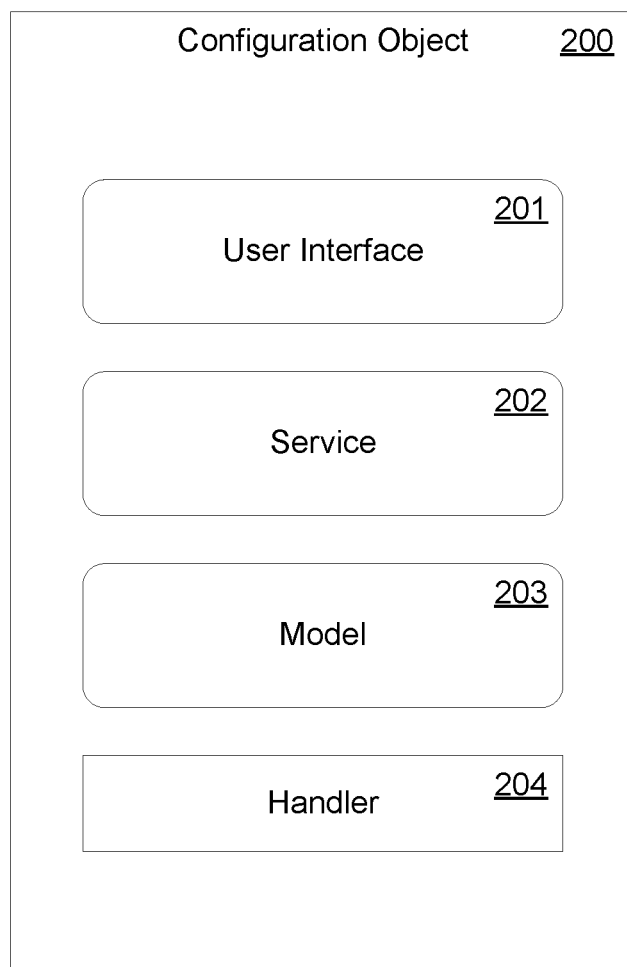
FIG. 2 is a diagram illustrating an architecture of a configuration object in accordance with an example embodiment.

FIG. 2 illustrates an architecture of a configuration object 200 in accordance with an example embodiment. Referring to FIG. 2, the configuration object 200 is a software artifact that handles configuration data which can be integrated into different software applications, services, and the like. The configuration object 200 may include user interface content 201 which provides information about displaying the content of the configuration object, services 202 for accessing the content, and a model 203 which includes metadata describing the structure for storing configuration content such as field names, field descriptions, data types, key attributes, and the like. The configuration object 200 may store its content in one or more tables. The tables may be located within the respective applications/services where the configuration object is incorporated. The model 203 may hold a storage format of the tables. The services 202 may include OData services, etc., for accessing the configuration content from the tables.

The configuration object 200 may also include a request handler 204 that is written in Java, for example. The request handler 204 may include business logic that runs when the tables are accessed by the services 202. The components 201, 202, 203, and 204 of the configuration object 200 may be packed into a Java Archive (JAR) file which can be transferred to applications and services. In some embodiments, the configuration object 200 may be associated with multiple applications of a tenant on the host platform. Furthermore, different applications may share access to one or more configuration objects.

A lifecycle of the configuration object 200 may include a development phase where the elements of the configuration are developed (e.g., UI 201, service 202, model 203, handlers 204, etc.) The lifecycle may also include a build phase where the elements are compiled by the respective compilers during a build process. The result is a software artifact (archive) which is referred to herein as the configuration object. The configuration object 200 may be deployed to a software repository. In addition, the lifecycle may include a consumption phase during which the configuration object 200 is consumed by an application and/or a service during a build time. In this phase, the configuration object 200 may be read from the software repository and its elements may be integrated into the service/application source code and/or libraries.

Meanwhile, a lifecycle of a software (application, service, etc.) may include a development phase where the artifacts, such as source code, are created. In addition, the software may include a build phase during which the source code (and other artifacts, if appropriate) are compiled and a software artifact (archive) is created. During the build phase, the configuration objects (such as configuration object 200) that is consumed by the application may be read from the software repository and integrated into the application/service source code. In addition, the software may include a deployment phase where the software archive of the service/application is deployed to a host platform such as a cloud environment, database tables, and the like.

In some embodiments, if the application/service is working with a configuration repository, the application/service may register the configuration objects that it uses with configuration repository such that configuration repository knows which application/service to update with new versions of configuration. The software may also include a running phase where the application/service is running and it can access the configurations stored in the database tables that were created for the consumed configuration objects.

Over time, a configuration object that is used by a tenant may be changed. The change may occur while the applications that rely on the configuration object are already running on a host platform (during runtime). In this case, the modification to the configuration object should be propagated to the applications and the corresponding microservices. That is, the modifications to the configuration objects should be distributed to the local storages of the respective applications and microservices that use the configuration object.

Figure 3A:
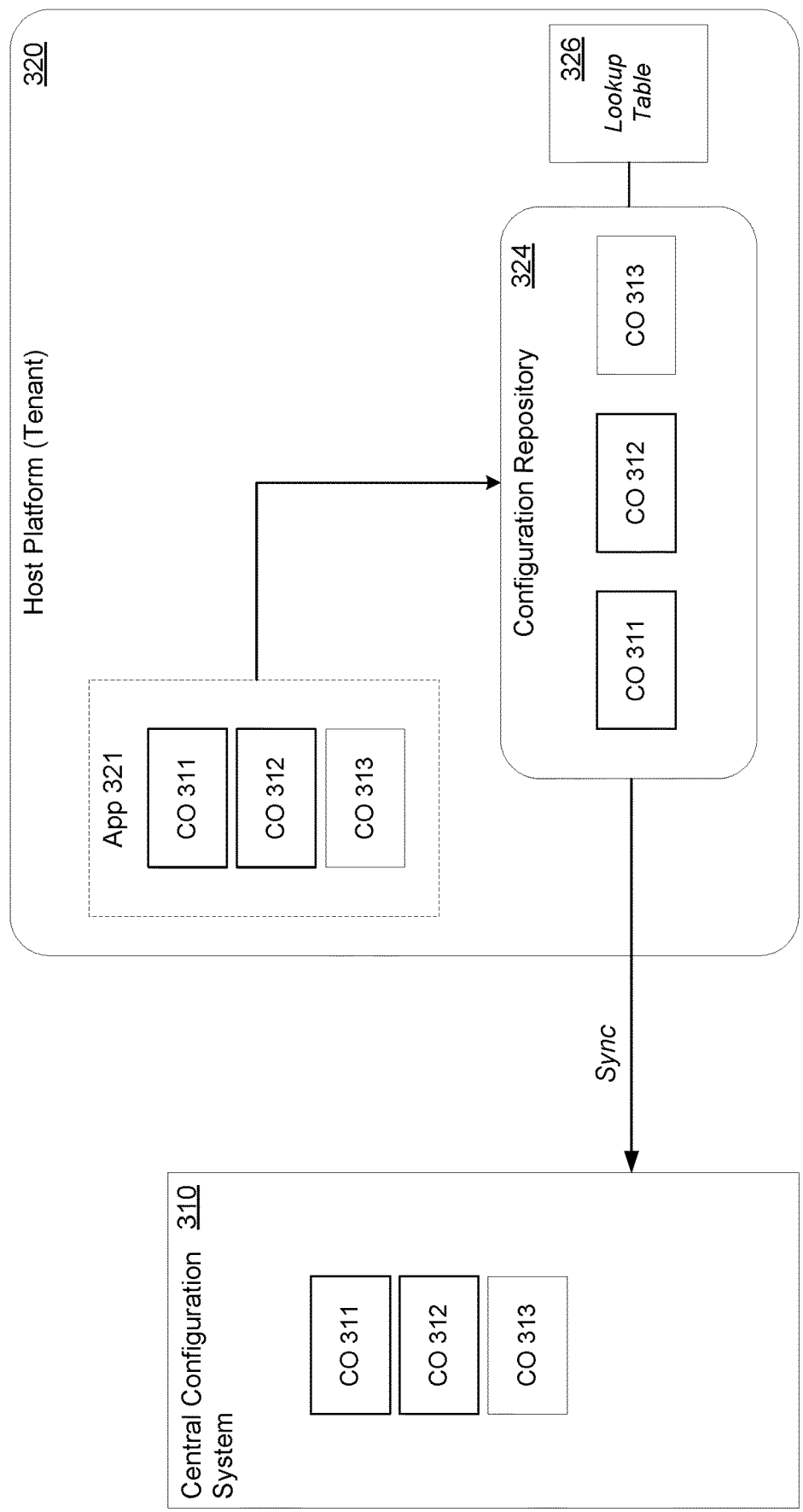
FIG. 3A is a diagram illustrating a process of synchronizing configuration content of an application with a central system in accordance with an example embodiment.

FIG. 3A illustrates a process 300A of synchronizing configuration content of an application 321 with a central configuration system 310 in accordance with an example embodiment. In this example, the central configuration system 310 may correspond to the central configuration system 110 shown in FIG. 1A. Meanwhile, a configuration repository 324 may correspond to the configuration repository 150 shown in FIG. 1B.

Referring to FIG. 3A, an application 321 is initially deployed to a host platform 320 which includes a dedicated instance for a tenant. In this example, the application 321 has a plurality of configuration objects 311, 312, and 313 that the application 321 uses. During the deployment of application 321 on the host platform 320, the configuration repository 324 may extract information about the configuration objects 311, 312, and 313 that are used by the application 321, and send the extracted information to the central configuration system 310. For example, the extracted information may identify a name, identifier, etc., of the configuration objects 311, 312, and 313. Thus, the central configuration system 310 knows that when a business process is configured that uses any of the configuration objects 311, 312, or 313, the respective configuration contents must be deployed to the host platform 320 for distribution to the application 321 via the configuration repository 324. This process may be repeated each time a new application is deployed to the host platform 320.

Furthermore, the configuration repository 324 may also store information about the configuration objects 311, 312, and 313 in a lookup table 326 of the configuration repository 324. In this example, the lookup table 326 may store application identifiers paired with configuration object identifiers in a table as shown below in the example of Table 1. Each time an application is deployed on the host platform 320, the configuration repository 324 may extract configuration objects from the application, forward the configuration objects to the central configuration system 310, and store identifiers in the lookup table 326. Thus, the central configuration 310 and the configuration repository are synchronized with respect to which applications use which configuration objects.

Although not shown in FIG. 3A, the central configuration system 310 may also synchronize updates to configuration content through any of the other systems (e.g., systems 130 and 140 shown in FIG. 1A, etc.) As another example, the metadata of the configuration content may be downloaded from the central configuration system 310 to the configuration repository 324. Here, the metadata may provide the fields, data types, etc., of the configuration content of an application. This allows the configuration repository to build a new configuration object. This is helpful when an application that already exists on another system (e.g., system 130 or 140 shown in FIG. 1A) is to be built onto the host platform 320. By downloading configuration content metadata of an application from the central configuration system 310, the configuration repository 324 can generate the required development artifacts (configuration objects) out of the metadata.

Figure 3B:
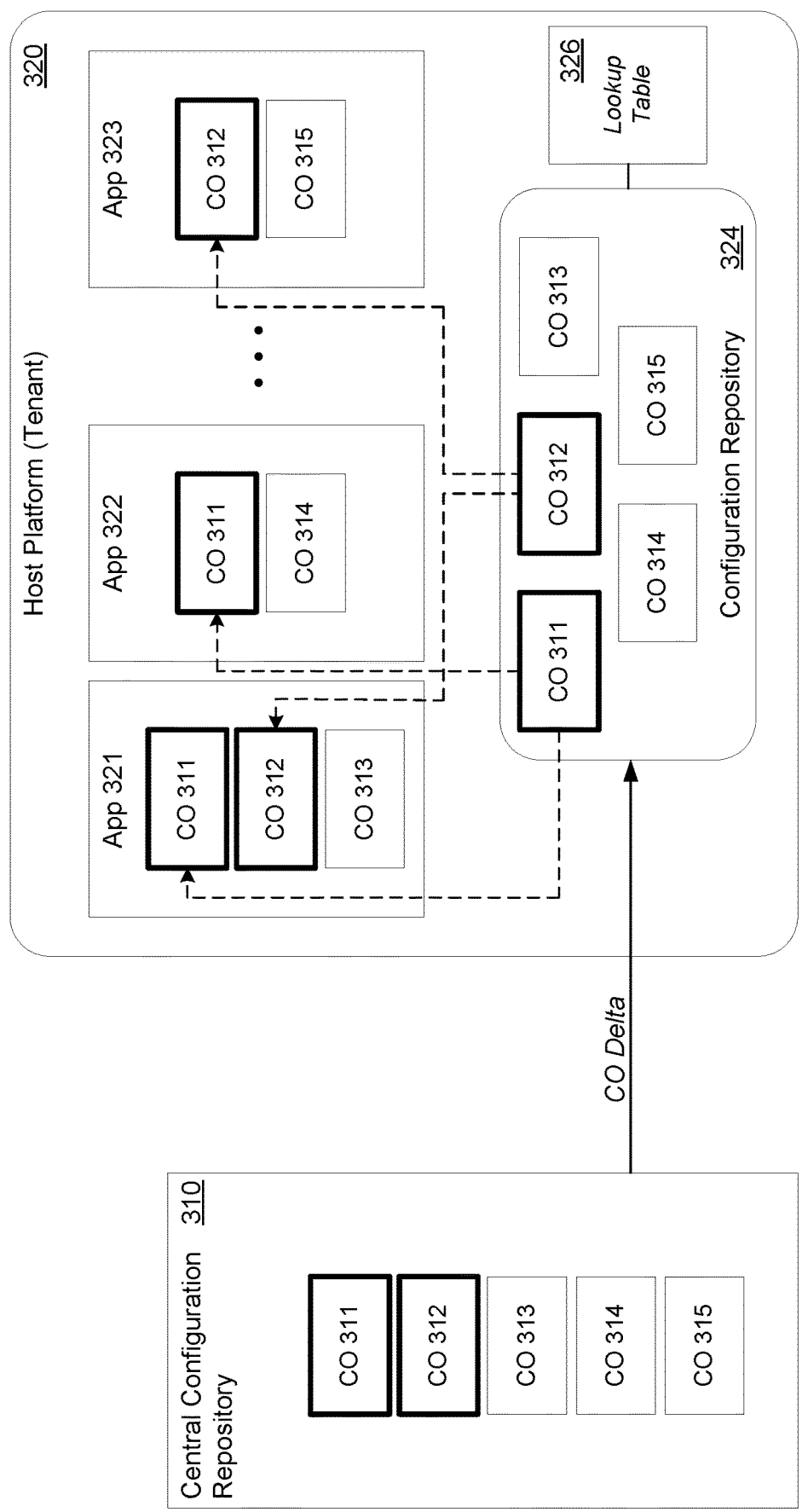
FIG. 3B is a diagram illustrating a process of updating configuration content of applications on a host platform in accordance with an example embodiment.

FIG. 3B illustrates a process 300B of updating configuration content of applications on a host platform 320 in accordance with an example embodiment. Referring to FIG. 3B, the central configuration system 310 provides updated configuration objects to the configuration repository 324 on the host platform 320. The configuration repository 324 may access the lookup table 326 with mappings between configuration objects and applications. An example of the lookup table 326 is shown below in Table 1.

TABLE 1

| Application | Configuration Objects |
| --- | --- |
| App 321 | CO 311, CO 312, CO 313 |
| App 322 | CO 311, CO 314 |
| App 323 | CO 312, CO 315 |
| ... | ... |

The host platform 320 includes three applications 321, 322, and 323 of a tenant that are running thereon. The three applications 321, 322, and 323 include an aggregate of configuration objects 311-315 across the applications 321, 322, and 323, where some of the configuration objects are assigned to multiple applications. In the Table 1 included within the lookup table 326, the mapping identifies that application 321 is registered with configuration objects 311, 312, and 313, application 322 is registered with configuration objects 311 and 314, and application 323 is registered with configuration objects 312 and 315.

In this example, the central configuration repository 310 provides an update to a subset of the configuration objects (i.e., configuration objects 311 and 312) of the tenant. The update (delta) is received by the configuration repository 324. In response, the configuration repository 324 may access the lookup table 326 and identify which applications are registered with which configuration objects. For example, the configuration repository 324 may identify that applications 321 and 322 are registered with configuration object 311. Furthermore, the configuration repository 324 may identify that applications 321 and 323 are registered with configuration object 312. Accordingly, the configuration repository 324 repackages the configuration objects 311 and 312 and distributes them to only the necessary applications. In particular, configuration object 311 is distributed to applications 321 and 322, and configuration object 312 is distributed to application 321 and 323. Thus, the configuration repository 324 takes each configuration object out of the received package of updates and transmits each configuration object to only the applications that are registered to use the configuration object. Furthermore, although not shown in FIG. 3B, the configuration repository 324 also distributes the configuration objects 311 and 312 to the corresponding services of the applications.

Figure 4:
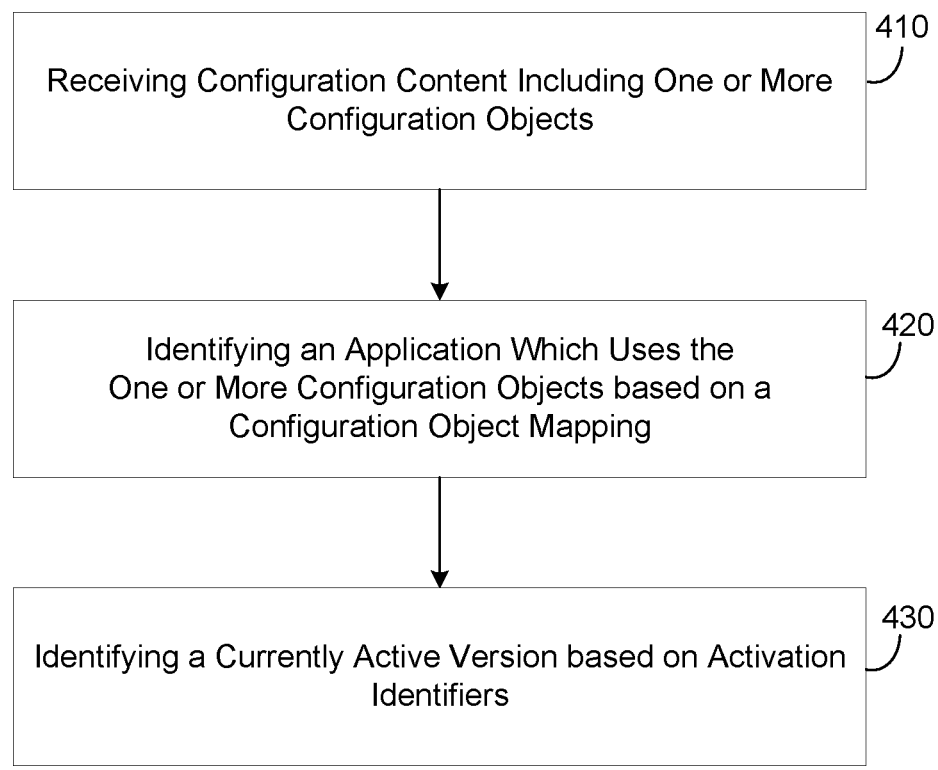
FIG. 4 is a diagram illustrating a method of distributing configuration content in accordance with an example embodiment.

FIG. 4 illustrates a method 400 of distributing configuration content in accordance with an example embodiment. For example, the method 400 may be performed by a software program such as an application, a service, or other program that is executing on a database node, a cloud platform, a server, a computing system (user device), a combination of devices/nodes, or the like. Referring to FIG. 4, in 410, the method may include receiving, via a host platform, configuration content from a central system. The configuration content may include one or more configuration objects of a tenant. For example, the configuration objects may include tables of configuration data, one or more services for querying the one or more tables of configuration data, a table format, and the like, for use with a function performed by the application. In some embodiments, the configuration content of the one or more configuration objects may include changes to previously stored configuration content of the one or more configuration objects.

In 420, the method may include identifying an application of the tenant on the host platform which uses the one or more configuration objects based on a configuration object mapping. For example, the configuration object mapping may include a mapping of configuration objects to applications. The configuration mapping may be tenant-specific and stored within a table, etc. In some embodiments, the identifying may include identifying a first configuration object that is mapped to a first application on the host platform and identifying a second configuration object that is mapped to a second application on the host platform, and distributing the first and second configuration objects to the first and second applications, respectively. In some embodiments, the configuration object mapping may be stored within an internal table of a configuration repository on the host platform.

In some embodiments, the method may include distributing the one or more configuration objects to the identified application of the tenant on the host platform. For example, a set of configuration objects may be received from the central configuration system. Not all configuration objects may be distributed to each of the tenant application. Instead, the applications may receive only the configuration objects that they are previously registered to use. In this example, a configuration object of a first application may be distributed to the first application and a second configuration object of a second application may be distributed to the second application. The distribution may be based on a mapping between the first configuration object and the first application, and a mapping between the second configuration object and the second application, within the configuration object mapping. Thus, the configuration repository may repackage the configuration objects such that only the required configuration objects are sent to each corresponding application.

In some embodiments, the method may further include extracting the one or more configuration objects from the application and storing the extracted one or more configuration objects in a file, in response to the application being deployed on the host platform. In some embodiments, the method may further include transmitting the file including the one or more extracted configuration objects of the application to the central system. In some embodiments, the method may further include distributing the one or more configuration objects to a plurality of microservices that make up the application.

Figure 5:
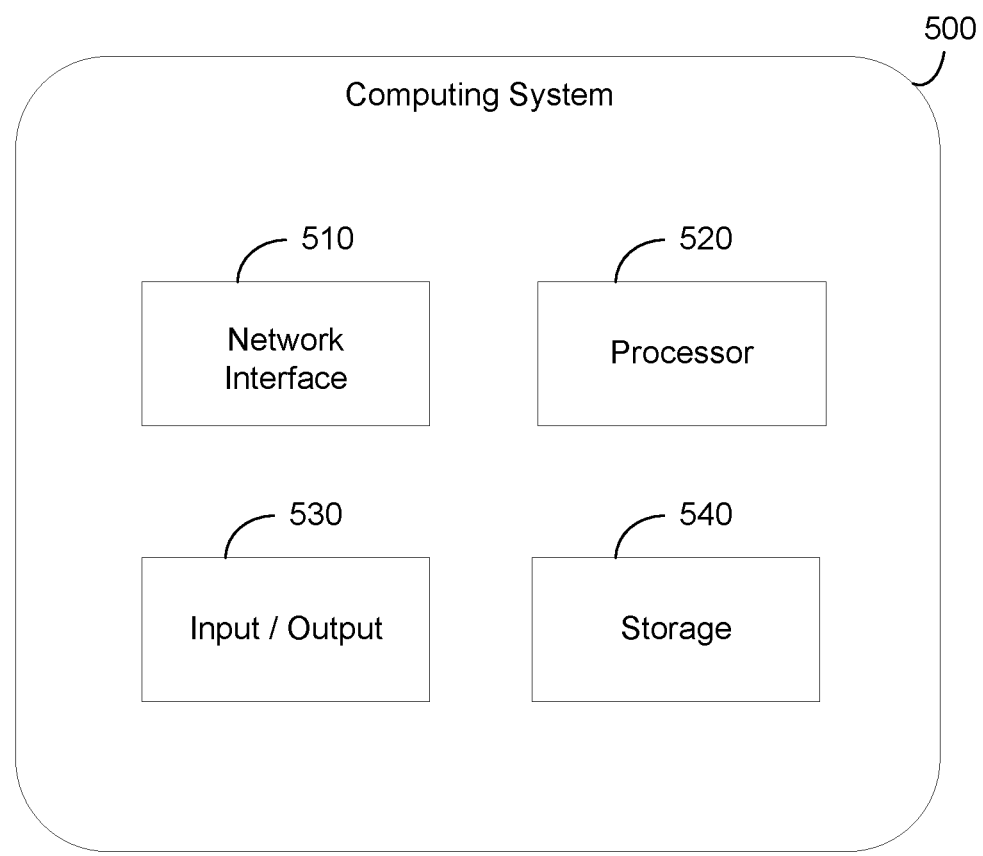
FIG. 5 is a diagram illustrating a computing system for use in the examples herein in accordance with an example embodiment.

FIG. 5 illustrates a computing system 500 that may be used in any of the methods and processes described herein, in accordance with an example embodiment. For example, the computing system 500 may be a database node, a server, a cloud platform, or the like. In some embodiments, the computing system 500 may be distributed across multiple computing devices such as multiple database nodes. Referring to FIG. 5, the computing system 500 includes a network interface 510, a processor 520, an input/output 530, and a storage device 540 such as an in-memory storage, and the like. Although not shown in FIG. 5, the computing system 500 may also include or be electronically connected to other components such as a display, an input unit(s), a receiver, a transmitter, a persistent disk, and the like. The processor 520 may control the other components of the computing system 500.

The network interface 510 may transmit and receive data over a network such as the Internet, a private network, a public network, an enterprise network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The input/output 530 may include an interface, a port, a cable, a bus, a board, a wire, and the like, for inputting and outputting data to and from the computing system 500. For example, data may be output to an embedded display of the computing system 500, an externally connected display, a display connected to the cloud, another device, and the like. The network interface 510, the input/output 530, the storage 540, or a combination thereof, may interact with applications executing on other devices.

The storage device 540 is not limited to a particular storage device and may include any known memory device such as RAM, ROM, hard disk, and the like, and may or may not be included within a database system, a cloud environment, a web server, or the like. The storage 540 may store software modules or other instructions which can be executed by the processor 520 to perform the method shown in FIG. 4. According to various embodiments, the storage 540 may include a data store having a plurality of tables, partitions and sub-partitions. The storage 540 may be used to store database records, items, entries, and the like. In some embodiments, the storage 540 may be configured to store instructions for managing a configuration repository for a distributed system.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs))

used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a processor configured to
        deploy a software application via a runtime environment of a host platform and identify configuration objects that have been integrated into the software application,
        determine storage formats of the configuration objects from models stored within the configuration objects and fill tables of the configuration objects with initial business content based on the determined storage formats,
        receive configuration content from a central system, the configuration content comprising an update to business content stored within a table of a configuration object from among the configuration objects,
        identify a plurality of microservices of the software application deployed on the host platform which consume the configuration object based on a configuration object mapping, and
        distribute the update to the business content stored within the table of the configuration content to the plurality of microservices, respectively, that are included in the software application to synchronize table data of the configuration content among each of the plurality of microservices.

2. The computing system of claim 1, wherein the configuration object comprises one or more tables of configuration data, one or more services for querying the one or more tables of configuration data, and a model with a storage format of the one or more tables.

3. The computing system of claim 1, wherein the configuration content of the configuration object comprises a delta of configuration content with respect to table data previously stored in the configuration object.

4. The computing system of claim 1, wherein the processor is configured to identify a first software application and a second software application deployed on the host platform that are mapped to the configuration object, and distribute the update to the table data to first and second groups of microservices of the first and second software applications, respectively.

5. The computing system of claim 1, wherein the configuration object mapping is stored within an internal table of a configuration repository on the host platform.

6. The computing system of claim 1, wherein the processor is further configured to extract an identifier of the configuration object from the software application during deployment of the software application and store the extracted identifier of the configuration object in the configuration object mapping, in response to the software application being deployed on the host platform.

7. The computing system of claim 6, wherein the processor is further configured to transmit the configuration object mapping to the central system.

8. The computing system of claim 1, wherein the processor is further configured to individually distribute the update to the table data of the configuration object to a plurality of local data stores of the plurality of microservices which already comprise the configuration object integrated therein.

9. A method comprising:
    deploying a software application via a runtime environment of a host platform and identifying configuration objects that have been integrated into the software application;
    determining storage formats of the configuration objects from models stored within the configuration objects and filling tables of the configuration objects with initial business content based on the determined storage formats;
    receiving, via the host platform, configuration content from a central system, the configuration content comprising an update to business content stored within a table of a configuration object from among the configuration objects;
    identifying a plurality of microservices of the software application deployed on the host platform which consume the configuration object based on a configuration object mapping; and
    distributing the update to the table data of the configuration content to the plurality of microservices, respectively, that are included in the software application to synchronize table data of the configuration content among each of the plurality of microservices.

10. The method of claim 9, wherein the configuration content of the configuration object comprises a delta of configuration content with respect to table data previously stored in the configuration object.

11. The method of claim 9, wherein the identifying comprises identifying a first software application and a second software application deployed on the host platform that are mapped to the configuration object, and distributing the update to the table data to first and second groups of microservices of the first and second software applications, respectively.

12. The method of claim 9, wherein the configuration object mapping is stored within an internal table of a configuration repository on the host platform.

13. The method of claim 9, further comprising extracting an identifier of the configuration object from the software application during deployment of the software application and storing the extracted identifier of the configuration object in the configuration object mapping, in response to the software application being deployed on the host platform.

14. The method of claim 13, further comprising transmitting the configuration object mapping including the identifier of the configuration object of the software application to the central system.

15. The method of claim 9, wherein the distributing further comprises individually distributing the update to the table data of the configuration object to a plurality of local data stores of the plurality of microservices which already comprise the configuration object integrated therein.

16. A non-transitory computer-readable medium comprising instructions which when executed by a processor cause a computer to perform a method comprising:
- deploying a software application via a runtime environment of a host platform and identifying configuration objects that have been integrated into the software application;
- determining storage formats of the configuration objects from models stored within the configuration objects and filling tables of the configuration objects with initial business content based on the determined storage formats;
- receiving, via the host platform, configuration content from a central system, the configuration content comprising an update to table data of a configuration object from among the configuration objects;
- identifying a plurality of microservices of the software application deployed on the host platform which consume the configuration object based on a configuration object mapping; and
- distributing the update to the table data of the configuration content to the plurality of microservices, respectively, that are included in the software application to synchronize table data of the configuration content among each of the plurality of microservices.

17. The non-transitory computer-readable medium of claim 16, wherein the configuration object comprises one or more tables of configuration data, one or more services for querying the one or more tables of configuration data, and a model with a storage format of the one or more tables.

18. The non-transitory computer-readable medium of claim 16, wherein the configuration content of the configuration object comprises a delta of configuration content with respect to table data previously stored in the configuration object.

19. The non-transitory computer-readable medium of claim 16, wherein the identifying comprises identifying a first software application and a second software application on the host platform that are mapped to the configuration object, and distributing the update to the table data to first and second groups of microservices of the first and second software applications, respectively.

20. The computing system of claim 1, wherein the processor is further configured to identify a plurality of configuration objects consumed by the software application during deployment, and generate a mapping during the deployment which identifies that the software application has consumed the plurality of configuration objects and record the mapping within the configuration object mapping.

21. The method of claim 9, wherein the configuration object comprises one or more tables of configuration data, one or more services for querying the one or more tables of configuration data, and a model with a storage format of the one or more tables.

* * * * *